United States Patent
DeConcilis et al.

(10) Patent No.: US 8,547,964 B2
(45) Date of Patent: Oct. 1, 2013

(54) AUTOMATIC TERMINATION PATH CONFIGURATION

(75) Inventors: Michael F. DeConcilis, Bloomingdale, IL (US); Richard Moore, Broomfiled, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 5 days.

(21) Appl. No.: 12/551,533

(22) Filed: Aug. 31, 2009

(65) Prior Publication Data

US 2010/0074251 A1    Mar. 25, 2010

Related U.S. Application Data

(63) Continuation-in-part of application No. 11/590,291, filed on Oct. 31, 2006.

(51) Int. Cl.
*H04L 12/56*    (2006.01)

(52) U.S. Cl.
USPC ........... 370/352; 370/355; 370/356; 370/392; 370/395.31

(58) Field of Classification Search
USPC ...................... 370/352, 355, 356, 392, 395.31
See application file for complete search history.

(56) References Cited

U.S. PATENT DOCUMENTS

| | | | |
|---|---|---|---|
| 4,009,344 A | 2/1977 | Flemming | |
| 4,009,345 A | 2/1977 | Flemming et al. | |
| 4,009,346 A | 2/1977 | Parker et al. | |
| 4,009,347 A | 2/1977 | Flemming et al. | |
| 5,406,620 A | 4/1995 | Pei | |
| 5,440,563 A | 8/1995 | Isidoro et al. | |
| 5,917,537 A | 6/1999 | Lightfoot et al. | |
| 6,657,989 B1 | 12/2003 | Hilsenrath | |
| 6,816,483 B1 | 11/2004 | Beckstrom et al. | |
| 7,321,932 B1 | 1/2008 | Monga et al. | |
| 7,565,448 B1 | 7/2009 | Schlesener et al. | |
| 7,843,835 B2 | 11/2010 | Yurchenko | |
| 8,150,009 B1 | 4/2012 | Croak et al. | |
| 2002/0141404 A1* | 10/2002 | Wengrovitz | 370/389 |
| 2002/0165961 A1 | 11/2002 | Everdell et al. | |
| 2003/0055985 A1 | 3/2003 | Corb et al. | |
| 2003/0061354 A1 | 3/2003 | Burg et al. | |
| 2003/0091032 A1* | 5/2003 | Laxman et al. | 370/352 |
| 2003/0123436 A1 | 7/2003 | Joseph et al. | |
| 2004/0205190 A1* | 10/2004 | Chong et al. | 709/225 |
| 2005/0068942 A1* | 3/2005 | Chu et al. | 370/352 |
| 2005/0157739 A1 | 7/2005 | Nelson et al. | |

(Continued)

OTHER PUBLICATIONS

International Search Report for PCT/US2010/045592, issued on Oct. 5, 2010.

(Continued)

*Primary Examiner* — Hassan Kizou
*Assistant Examiner* — Emmanuel Maglo (57) ABSTRACT

There is provided herein a system and method for automatic configuration of data routings for use with electronic data such as phone calls, faxes, etc. In an exemplary embodiment, when more than one carrier might potentially terminate the transmission, the carriers are ordered based on some screening criterion (e.g., transmission price). Data transmissions are then assigned to the carriers based on the sorting order, with the second place and lower carriers (e.g., the higher priced carriers) not being selected unless the first carrier cannot complete the transaction. The switch instructions necessary to implement this scheme may be generated automatically.

22 Claims, 7 Drawing Sheets

(56) References Cited

U.S. PATENT DOCUMENTS

| | | | |
|---|---|---|---|
| 2005/0190750 A1* | 9/2005 | Kafka et al. | 370/352 |
| 2005/0220095 A1* | 10/2005 | Narayanan et al. | 370/389 |
| 2007/0053342 A1 | 3/2007 | Sierecki et al. | |
| 2007/0165613 A1* | 7/2007 | Soo et al. | 370/356 |
| 2008/0037430 A1* | 2/2008 | Wah et al. | 370/241 |
| 2008/0101235 A1* | 5/2008 | DeConcilis | 370/235 |
| 2009/0003573 A1 | 1/2009 | Long et al. | |
| 2009/0074173 A1 | 3/2009 | Davis et al. | |
| 2010/0054447 A1 | 3/2010 | DeConcilis | |
| 2010/0061274 A1 | 3/2010 | DeConcills | |
| 2012/0257617 A1 | 10/2012 | Bugenhagen et al. | |

OTHER PUBLICATIONS

Written Opinion for PCT/US2010/045592, issued on Oct. 5, 2010.

Nortel Networks, "DMS-Global Services Platform", "Advanced international switching system for seamless voice/data services worldwide", Dec. 1999, Publisher: Nortel Networks, Published in: US.

Nortel Networks, "DMS-Global Services Platform", "System Advantage", Jan. 1999, No. 2, Publisher: Nortel Networks, Published in: US.

Nortel Networks, "DMS-Global Services Platform", "Software Portfolio Year 2000", Nov. 2000, No. 1, Publisher: Nortel Networks, Published in: US.

Nortel Networks, "DMS-Global Services Platform", "Feature Planning Guide", Jun. 2000, No. 4, Publisher: Nortel Networks, Published in: US.

Worldlink, "Switch Partition", Oct. 31, 2006, Publisher: Virtual Network, Published in: US.

European Patent Office PCT International Search Report, International Application PCT/US07/82514, mailed Apr. 8, 2008.

European Patent Office PCT Written Opinion of the ISA, International Application PCT/US07/82514, mailed Apr. 8, 2008.

Extended European Search Report, dated Jan. 2, 2013, EP Application No. 10812494.2, 6 pgs.

Canada Examination Report, mailed Aug. 7, 2012, Application No. 2667827, 2 pgs.

* cited by examiner

AUTOMATIC TERMINATION PATH CONFIGURATION

CROSS REFERENCE TO RELATED APPLICATION

This application claims the benefit of priority to and is a continuation-in-part of U.S. patent application Ser. No. 11/590,291, entitled Automatic Termination Path Configuration, filed Oct. 31, 2006. The aforementioned patent application is assigned to an entity common hereto, and the entirety of the aforementioned patent application is incorporated herein by reference for all purposes.

TECHNICAL FIELD

Embodiments herein generally relate to transmission and routing of data and, in particular, to methods for transmitting and routing digital information such as telephone calls to an end location via multiple carriers according to time-varying criteria.

BACKGROUND

In conventional telecommunication networks, data (e.g. voice data) is transmitted from an originating source to an end recipient via an intermediary, where the method by which the information is routed is dependent on multiple time-varying factors. In this manner, a data intermediary connects multiple data originators ("customers," hereinafter) with customer-specified termination points via a multiplicity of possible carriers that could potentially handle the transmission ("carriers," hereinafter). For example, a conventional data intermediary can take an order (e.g., accept a phone call, fax, etc.) from a customer, identify a carrier that is able to transmit the data to the required terminus, and then pick-up the data from the customer and transmit to the carrier for delivery.

Oftentimes, the routing choice might be based on some combination of the cost, quality, and other factors. For instance, each carrier that could possibly terminate the data transmission at a specified location might potentially charge a different rate for such a termination. Further, the quality of the communications conduit that each carrier provides may vary between carriers and from time to time. Conventionally, the carrier that offers a combination of the lowest price and highest quality will typically secure orders up to its maximum bandwidth capacity.

In some instances, a conventional data intermediary will charge the customer a per-minute (or per byte, etc.) charge for data transmission. Typically, this charge will be based on the then-current fee charged to the intermediary by one or more of the carriers for the same quality of data transmission to the selected location. The rates charged by the various carriers are subject to change. In some instances, the ability of the carriers to change transmission prices is limited by contract and requires, for example, some number of days of advance notice (e.g., seven days) to the intermediary. From the standpoint of the intermediary, when a carrier changes its pricing structure there is an incentive to do the same with respect to its own customers, and this is especially true in the case where the carrier increases transmission prices. In some instances, volume-based discounts may be available from the carrier and/or discounts might be offered to induce an intermediary to move business from one carrier to another.

In other instances, the customer may impose geographic or other routing requirements on the intermediary, which can further complicate the delivery process. For example, some customers may require the intermediary to transmit its data to the intended destination so as to avoid certain countries or travel only through a short list of approved countries.

SUMMARY

Embodiments generally disclosed herein include a computer-implemented method and system for configuring a signal path between a customer entry point and a termination destination. The method and system are capable of selecting a carrier capable of accessing the termination destination. In doing so, the method determines a routing for the signal path between the customer entry point and a carrier exit point accessible by the selected carrier. In one example configuration, the signal path passes through at least one switching device.

Other exemplary embodiments include a computer-implemented method and system for provisioning routing instructions between a customer entry point and a termination destination while using, at least in part, a packet-switched network. The method and system are capable of inputting routing instructions into a command translation application. The command translation application translates the routing instructions into Internet protocol (IP) packet-based routing instructions. Further, the command translation application inputs and queues the packet-based instructions for further processing. The translated packet-based instructions are then outputted to a network provisioning service to be implemented in the packet-switched network. Furthermore, other exemplary embodiments provide for customer-specific information to accompany the packet-switched routing instructions.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which: invention.

FIGS. 1A and 1B illustrate the general environment of the instant

DETAILED DESCRIPTION

While this invention is susceptible to many different embodiments, the drawings illustrate, as will be described herein, some specific embodiments of the instant invention. It should be understood, however, that the present disclosure is to be considered an exemplification of the principles of the invention and is not intended to limit the invention to the specific embodiments or algorithms so described.

General Environment

Figure 1A:
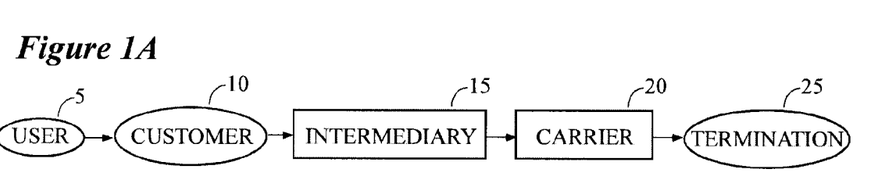
Figure 4:
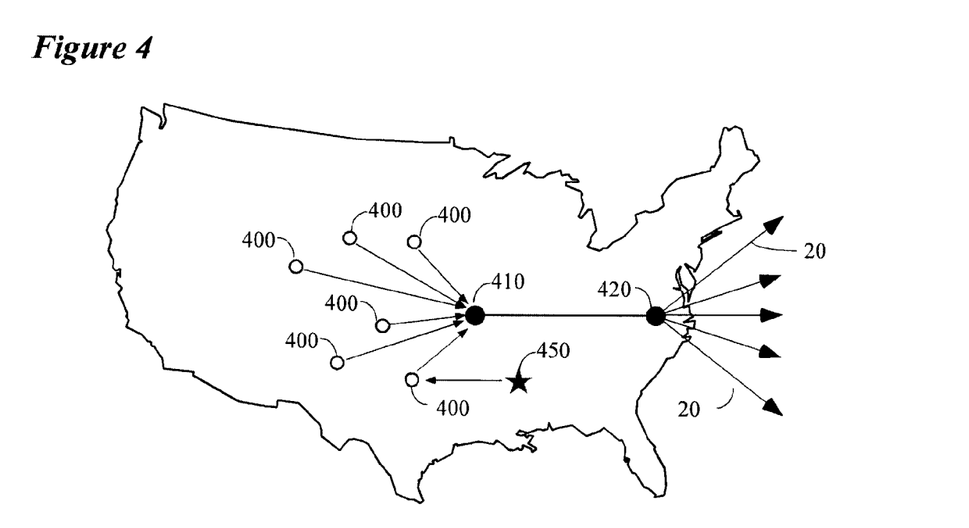
FIG. 4 depicts a conceptual drawing of an exemplary embodiment of the instant invention.

The instant invention may be used in the environment of international voice and data termination. FIGS. 4 and 1A illustrate in greatly simplified terms the general environment in which the instant invention would characteristically be used. As an aid to understanding the invention taught herein but without any intention to limit the instant invention to the facts of this example, consider the familiar scenario of a user who wishes to place an international telephone call. The user (or the phone owner) will have previously contracted with a local communications (e.g., telephone) company to handle calls that are placed through his or her phone. When the call is placed, it is picked up by the contracting communications company and, without further intervention on the part of the user, is terminated internationally at another phone which has been assigned the number dialed by the user. The local communications company does not typically carry the phone call the entire distance to its destination, but instead passes off the call to others for actual termination.

Some additional details of the previous scenario are illustrated in FIG. 4. As is suggested in this figure, in a typical configuration one or more telephone companies (or customers 400 hereinafter) will transmit requests for remote termination from their respective users 450 to a local facility location 410 of an intermediary. Note that there might be many such local facility locations 410, although in this simplified example only a single such facility 410 is shown. The facility 410 will typically aggregate the requests from multiple customers 400 (and/or multiple requests from different users 450 of the same customer) and transmit those requests via a high-speed link (e.g., a fiber optic cable) to a centralized location 420, which might be a colocation facility of the intermediary. At this sort of centralized location 420, each signal (e.g., a telephone or fax call) from a customer 450 is handed off to one of potentially many carriers 20 that can transmit the signal on to its intended destination. Examples of customers 400 of the sort contemplated herein include wired and wireless telephone companies such as Sprint, Cingular, etc.

Focusing now on the role of the intermediary 15 and turning next to FIG. 1A, in a typical scenario, a user initiates a data transfer request (e.g., he or she might dial a phone number). The call is fielded by a customer 10 which then forwards the data transmission request to an intermediary 15 which is responsible for identifying and selecting a carrier 20 that can take the data transmission on to its intended destination/termination 25. As has been mentioned previously, some examples of data transmissions suitable for use with the instant invention include telephone calls, faxes, video/audio programming, etc.

Figure 1B:
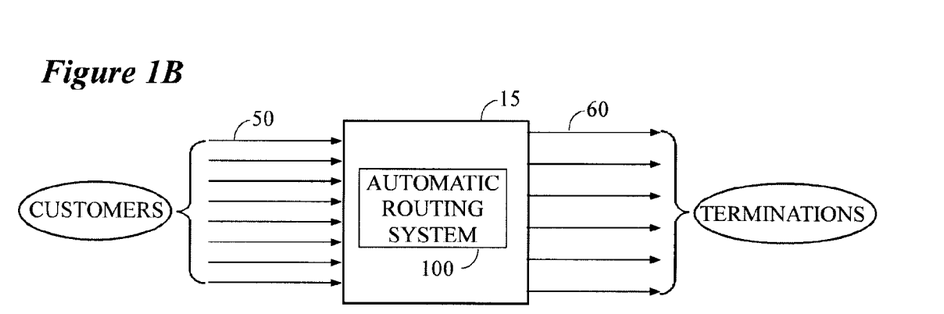

FIG. 1B illustrates in greater detail how an exemplary embodiment of the presently disclosed methods and systems fit within the schematic of FIG. 1A. That is, in a typical implementation, the intermediary will receive data transmissions 50 from multiple customers. Each of these transmissions might potentially arrive from a different customer, although it is anticipated that each customer will send many data transmission requests to the intermediary 15. The data transmissions 50 might arrive wirelessly, via a wired connection, or some combination of the foregoing.

One function of the intermediary 15 is to detect and accept the data transmissions 50 from the customer, determine a best (or at least an acceptable) routing that will take the data to its ultimate destination, secure a carrier 40 to implement that routing, and internally configure switches to cause the data transmissions 50 to be transferred to the appropriate carrier 60. In conjunction with this operation, it should be understood that various financial matters will necessarily need to be administered afterward (e.g., in a typical scenario the customer will bill the user/originator for the call, the intermediary will bill the customer, and the carrier will bill the intermediary). For purposes of specificity only, and by way of example, in some cases there will be about 50-60 different customers providing data to the intermediary and, perhaps, 40 or so available carriers.

Figure 3:
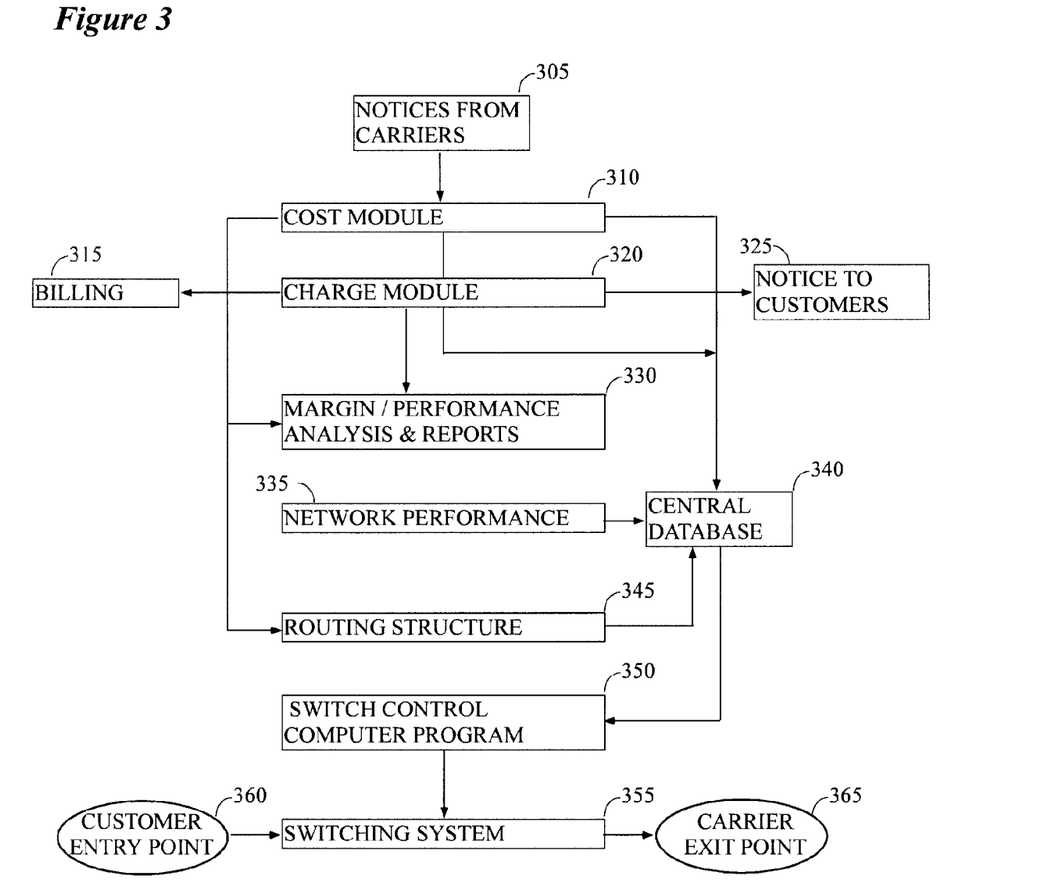
FIG. 3 depicts an example schematic illustration of a system which includes the instant invention.

According to an exemplary embodiment, there is provided a system and method for automatic routing of voice and data transmissions which has a configuration generally as set out in FIG. 3. As is illustrated by the exemplary embodiment in FIG. 3, a central computerized database 340 is shown which is designed to hold and make available data that is important to the routing operation discussed hereinafter. Among the sorts of information that might be maintained within this database are the quality level(s) provided by a carrier, its available bandwidth, the current contract price(s) with that carrier, etc. Obviously, the value of each of these carrier parameters could potentially be subject to change at any time, e.g., in some cases they might change hourly. Additionally, the database 340 will may also be used to store information such as the requirements of each customer with respect to, for example, transmission quality, routing instructions, current contract price(s), etc. Finally, in some exemplary embodiments the database 340 will contain information relating to the physical configuration of the network, details of the intermediary's internal switching system, a representation of the network topology, etc. All of the foregoing is just an example of the sorts of information that might be stored in this database 340. Finally, it should be understood that the term "database" is meant to include, not only the information stored therein, but also whatever combination of software and/or hardware might be necessary to access, search, and otherwise utilize the stored information for the purpose of the various exemplary embodiments described herein. Further, the database itself need not be a hierarchical or other structured database but could be, for example, merely a flat file containing a sequential listing of data records.

In electronic communication with the database may be a collection of software and/or hardware modules that are responsible for different aspects of the system's operation, which modules may include a software cost module 310 which is responsible for, among other things, intercepting communications 305 (typically sent via e-mail) from carriers that are intended to give advance notice of rate changes. If a carrier has raised the price of data transmission, such information may be identified and extracted from an incoming e-mail so that it can be communicated to and stored within the central database 340, thereby potentially making such information available to everyone in the organization who might need to know it. Receipt, identification (possibly automatic), and storage in the database 340 of such notices means that this information is available for use by, for example, the charge module 320 which may contain current customer pricing information and other contract details such as the length of advance notice that is required in order to be able to modify each customer's contract, the current terms, etc. So, when notice is received of a price increase from a carrier, a similar notice 325 (based, for example, on a fixed margin or percentage markup) may automatically be sent to the customer(s) who are affected by the price change, thereby reducing to a minimum the length of time that the intermediary must wait pursuant to contract before modifying its own prices accordingly. Similarly, the charge module 320 may be used in concert with usage information that might be stored in the database 340 at least for purposes of sending statements to clients (e.g., via billing module 315).

Another exemplary aspect of the instant inventive system involves the use of a margin/performance analysis and reporting module 330. That is, in some exemplary embodiments the transmission price charged to customers will be a predetermined markup (e.g., percent or flat amount) from the cost to transmit the customer's data via a selected carrier. The module 330 may be able to automatically make that calculation based on prices charged by each carrier. Additionally, this module 330 may be able to produce printed or electronic reports that summarize the activity of each customer and each carrier and, based on the price differential at the time of the transaction, determine the associated profitability.

As another exemplary component of the instant system, a network performance module 335 may be implemented. The network performance module 335 is intended to provide some tracking of the number of data transmission requests that have been delivered to the intended destination (e.g., completed), such tracking possibly being done separately for each carrier. Those of ordinary skill in the art will recognize that this sort of information can be of critical importance in evaluating a carrier's reliability and when making routing decisions.

In communication with the central database 340 and the cost module 310 may be the routing structure module 345. For purposes of the instant disclosure, the "routing structure" of a system will be understood to mean the collection of carriers and associated signal paths that could be used to carry a client's data to a given destination. One example aspect of this module 345 is that it will be used to compile an inventory of carriers that can terminate to a particular destination and the cost (and transmission quality, etc.) associated with each. More broadly, the routing module 345 could utilize network performance information (from module 335 or obtained elsewhere) to compile an assessment of the reliability of each carrier as measured by completed data transactions, incomplete transactions (e.g., dropped calls), etc. Note that in an exemplary embodiment, the actual routing structure will be determined by reference to the database 340, where information such as cost/quality trade offs for each carrier, customer routing preferences, etc., may be available. In an example arrangement, the actual routing decisions will be made in conjunction with the information obtained by the routine structure module 345.

As a next example aspect of the instant system, a computerized switch control module 350 will be used to convert the routing information into switch instructions, e.g., into instructions that specify how to update the routing tables on the proper switch or switches. That is, and as is described in greater detail below, a signal path will be determined (automatically or manually) between a customer entry point 360 and a carrier exit point 365 (e.g., a port within a switch), the chosen signal path obviously being a function of the components of the switching system 355, the particular customer and carrier, and various other constraints imposed on the transmission by the customer, the carrier, the economics of the transaction, etc. The resulting signal path may be created by communicating switching instructions that have been generated by the module 350 to the switching system 355. Note that such instructions might take the form of physical and/or logical switch commands that are to be executed within each of the possibly numerous electronic switching device that comprise at least a part of the chosen signal path, but the commands may be designed to update the tables on the switch to implement the desired routing. The switch control module 350 may be in electronic communication with the central database 340 and responsive to commands from it including, for example, the chosen routing information. In some exemplary embodiments, the routing will be manually determined and such information will be directly entered into the software module 350, thus making the connection to the central database optional.

Figure 2:
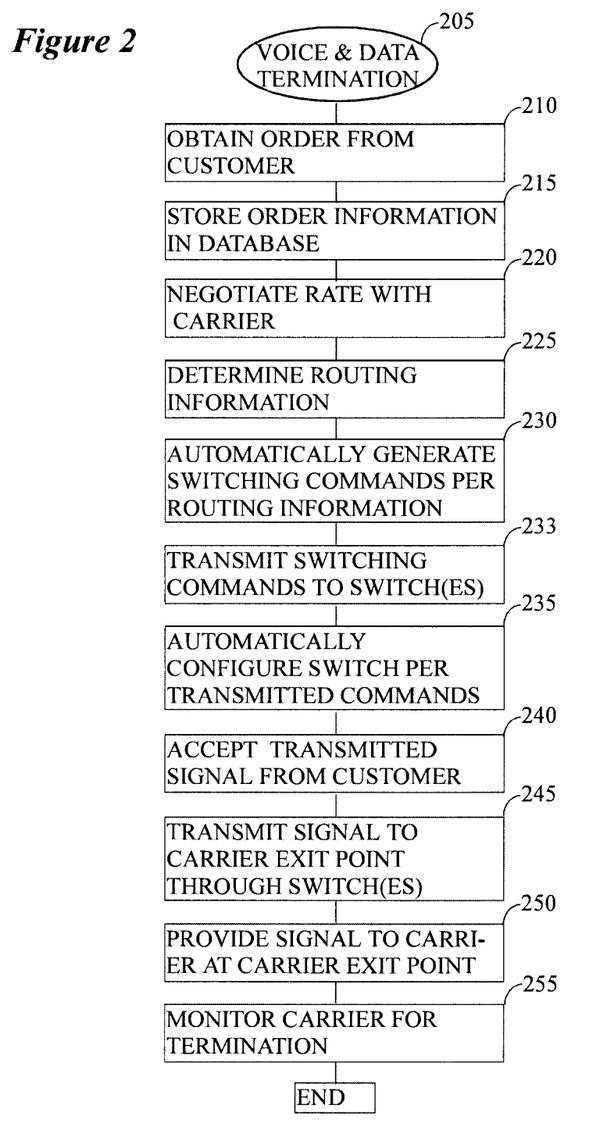
FIG. 2 depicts a schematic illustration of a first exemplary embodiment of the instant invention.

FIG. 2 depicts and example method of automatically configuring a transmission path 205. As a first example step, an order will be obtained from a customer 210. Those of ordinary skill in the art will understand that this order might be taken verbally, electronically, etc., depending on the nature of the business arrangement. In any case, a typical agreement will entail a contract with the intermediary to carry the customer's data, typically voice and fax communications, from the United States to a foreign country, i.e., an international termination. That being said, it should be clear that the methods disclosed herein would be equally applicable to a local (e.g., within the United States) termination.

As a next example step, the information related to the order will be stored in a central database (step 215). Although this step is optional, it is beneficial for a number of reasons. First, central storage of such information makes it possible for others in the organization (e.g., the buyers of carrier bandwidth) to access it. Additionally, after it is stored this information will be readily available in the event that a carrier revises its price upward and all customers who would be affected thereby need to be contacted.

As a next example step 220, a rate structure will be negotiated with a carrier that is capable of terminating data transmissions in the customer's designated location. Needless to say, the rate structure will need to be profitable for the intermediary (except in special circumstances). Note that steps 220 and 220 might occur in any order, e.g., carrier bandwidth might have been secured far in advance of entering a deal with the customer. Unless the same individual happens to secure the carrier contract as negotiated the customer's order, it is likely that the information related to the customer's order will need to be read from the database, which argues for centralized storage of such information so that it will be available for use as needed.

Next, the routing structure between the customer and the carrier may be determined (step 225). In some exemplary embodiments, the routing will be determined automatically. In other embodiments, the routing will be determined manually. However, in either case an object of the routing is to specify a path from the customer to the carrier via switching system 355. Note that the switching system 355 might consist of only a single switch but, more typically, could represent tens or even hundreds (or more) interconnected switches wired in series or in parallel. As a simple example, in some cases the customer will have signals that are available for pickup in Los Angeles and the carrier that is handling an international termination has a point of presence in Boston. In such an instance, the routing could involve many different switches and the signal path could travel over many hundreds of miles from its source to its U.S. destination under supervision of the intermediary. As a consequence, it should be understood that the process of determining the routing could be a complex task in some instances. In some exemplary embodiments, step 225 will be performed manually and in other variations it will be performed automatically, depending on the preferences of the intermediary in this regard. Further, such routing may include contingency routing information in the event that a problem develops along the chosen path or in the event that a selected carrier is unable to carry the transmission. This might happen, for example, if a carrier's capacity is exceeded, if a carrier has technical problems that cause it to be unable to fulfill its obligations, etc. In such a case, it would be useful to have an alternative routing available so as to disrupt service to the customer as little as possible.

As a next example step, given the routing information the actual switching instructions will be automatically generated (step 230) and the appropriate switch commands transmitted to the switch or switches that are in the prospective signal path (step 233). That is, each of the various switch or switches that make up the communications network are programmable according to techniques well know to those of ordinary skill in the art, e.g., each switch in the signal path will be sent instructions to update its routing table(s) appropriately. In most cases, a dedicated computer program provided by the switch manufacturer is used to reassign inputs and outputs by transmission and receipt of a series of machine language (or other) instructions. However, in one exemplary embodiment this step will be performed by a multi-function computer program that automatically translates the designated routing information into switch instructions.

As a first example step in the process of automatically generating the switching instructions, the routing path will be automatically converted to machine readable form, e.g., the routing information will be manually entered into a computer program that has been created for the purpose of generating switching instructions. Such a program may very well have other functions, but at least one function should be to convert the routing information obtained in step 225 into switching instructions for each switch in the signal path between the customer entry point and the carrier exit point.

As a next example step, the switching instructions determined in step 230 will be communicated (step 233) and applied to the one or more switches in the signal path (step 235), thereby creating a signal path from the customer's entry point to the selected carrier's pickup point.

According to an exemplary embodiment, the instant method can proceed with the reception (step 240) of data from the customer and the transmission of that data from the point of entry to the point where the carrier can pick it up for retransmission (step 245) via the route selected previously (step 225).

Furthermore, the method can monitor the data that was handed to the carrier for successful termination (step 250). As has been discussed previously, although this might be done for many reasons, one example reason for doing this is for purposes of quality control, with transmissions that are not properly terminated being indicative of poor quality on the part of the carrier.

Figure 5:
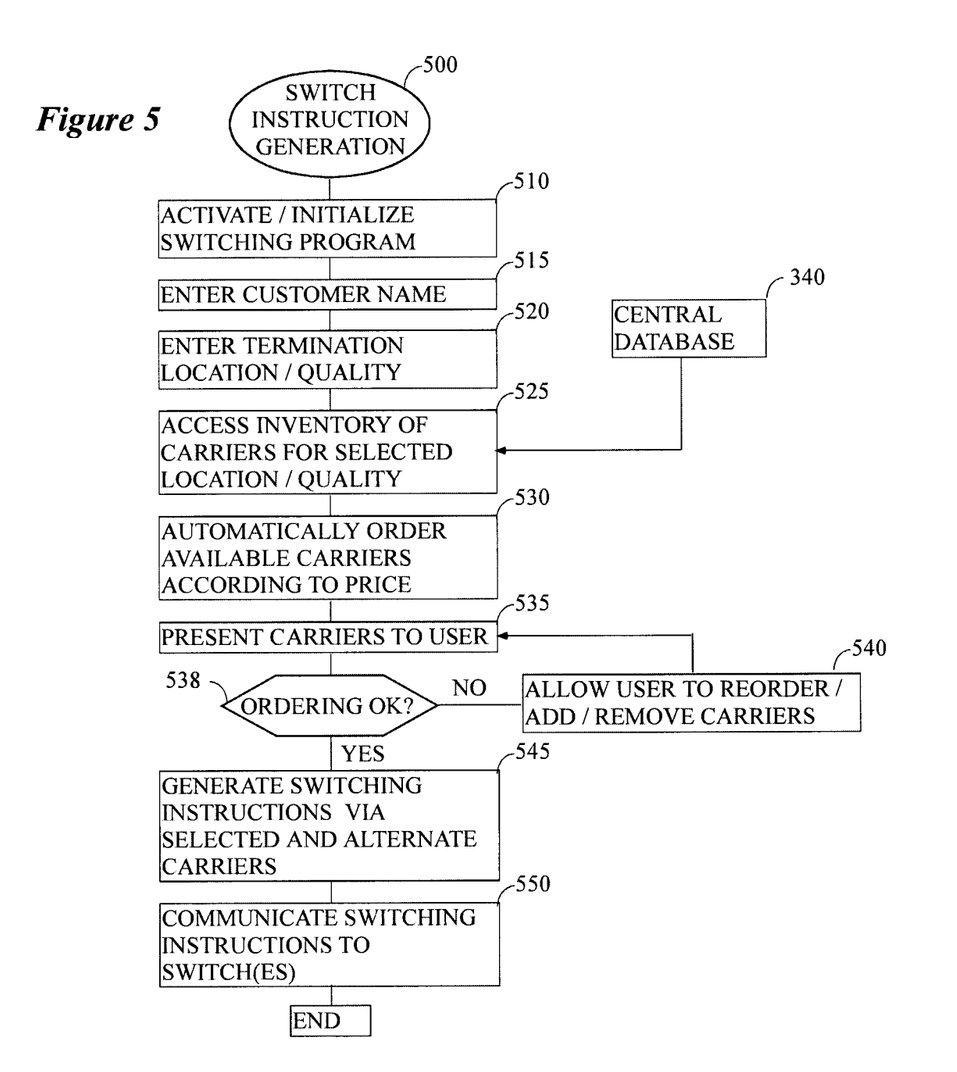
FIG. 5 depicts an example operating logic suitable for use with the instant invention.

Turning next to a more detailed discussion of steps 225 through 233, as is generally indicated in FIG. 5 in an exemplary embodiment the instant switching method 500 will begin with the activation of a computer program by a user (step 510). As is customary in such instances, the program will initialize various internal program variables and prepare to interact with a user. Note that the program might be activated upon the receipt of a new order from a customer, in response to an announcement of a price change from a carrier, etc.

As a next example step, the user will enter the customer's name (step 515) or some other designation sufficient to identify a customer (e.g., a customer identification number or serial number). In some instances, details concerning the customer's preferences (e.g., quality/price tradeoffs preferences, routing instructions, etc.) might be read from the central database 340 or some other source.

Next, the user may enter information related to the customer's specified termination location (e.g., the chosen country) and/or an example transmission quality (step 520) into the program 500. As has been discussed previously, in some cases at the time the order is placed the customer will specify whether there is a preference for a higher or lower quality transmission and such a preference may be indicated at this point. If this information has not been specified in connection with the current transaction it certainly could be determined, for example, by reference to a default data quality as might be stored, for example, in the database 340.

As a next example step 525, an inventory of carriers that can terminate in the selected country and that can provide the required transmission quality will be accessed, perhaps by reading them from the central database 340. Obviously, this step is dependent on the carrier information having been previously stored in the database, with the location and format of such information largely determining how step 525 is to be implemented.

Next, the instant program may automatically sort or otherwise order the carrier inventory according to a predetermine criterion before presenting them to the user (step 530). In an exemplary embodiment, the carriers will be sorted by transmission price. That is, and assuming that more than one carrier can terminate in the selected location, the carriers may be sorted in order of increasing price, with the lowest price character being "first" or most preferred. This assumes that all of the chosen carriers offer the same quality level. In such an instance, price should be a consideration and the instant program orders the carriers accordingly. Those of ordinary skill in the art will recognize that the ordering might be made based on any arbitrary performance, quality, or economic-related variable etc., but, for purposes of specificity in the text that follows, it will be assumed that price for the same quality level is used to order the carriers. More generally, for purposes of the instant disclosure the term "screening criteria" will be used to refer to any carrier related variable that might be used to arrange the carriers in order of preference. Further, it is entirely likely that the sort order could be based on multiple ones of the screening variables (e.g., price and quality). The methods used to sort such multivariables are well known to those of ordinary skill in the art.

It should be noted that one possible reason that the carriers are sorted according a variable such as price is to provide a default ordering in the event that a carrier is unable for whatever reason to terminate a given transaction. By way of explanation, the carrier that is sorted "first" in the list will be the lowest-cost provider for a given quality level. Carriers that are sorted further down in the list will be those that are more expensive at the same level of quality. Logically, other things being equal so long as customer's call can be handled by the lowest-price carrier, that carrier will be allowed to terminate the call, thereby maximizing profit to the intermediary. However, if the first carrier cannot complete a call (e.g., if a carrier must reject a call because its bandwidth has been filled) the second carrier in the list may be utilized, and so on.

As a next example step, the user will be presented with the ordered list of carriers (step 535) and then asked to approve the list (step 538). If the ordering is acceptable, the program may proceed to the next step. On the other hand, if the user wishes to manually reorder the list, he or she may be given that opportunity (step 540).

The ordered list of carriers may be utilized in connection with the switching system as follows. In one exemplary embodiment, a switch such as a DMS-GSP switching system by Nortel can be used. In another exemplary embodiment, an IP-based core routing engine switch, such as a Sonus PSX, can be used. Switching systems such as these provide a programmer with a variety of options, including automatic rerouting in the event that one carrier in a list cannot or will not accept a data transmission. One means of utilizing this capability is to program the switch to sequentially select the carriers in the order specified at step 538. Then, if the first carrier (e.g., the one with the lowest price) fails to accept the call, the second carrier (next lowest priced) carrier will be automatically selected, and so on. Those of ordinary skill in the art will understand that the switch will be informed of a carrier's rejection of a transmission according to telecommunications conventions that are old and well known in the art.

As a next example step 545, the instant program will convert the termination location, as well as the preferred carrier ordering, into switch instructions for use in programming the one or more switches that are situated along the electronic path between the customer and the chosen carrier. Of particular importance when there is more than one potential carrier is the fact that the program 500 should generate the switch instructions (e.g., the switch routing table entries) that are necessary for selecting the chosen carrier—as well as those instructions that provide for the selection of at least one alternative carrier. Those of ordinary skill in the art will understand the sorts of switching instructions that might be generated by this program 500, given the criteria discussed above.

Finally, the switching instructions may be communicated to the switch or switches (step 550) electronically according to methods well known to those of ordinary skill in the art, thereby preparing the signal path for receipt of a data transmission from that customer.

In operation, each item of information (e.g., each packet) that is received from a customer either arrives with—or is assigned—an identifier that might be associated with, among other things, the intended destination of that item. By way of example, each item of information may have an associated "destination code" that specifies the intended destination country. The presence of a destination code makes it possible for any switch that sees such data to route it to the chosen destination according to the switch's programming. Thus, for example, when a switching system is the recipient of such an item of information, it is able to route such information internally according to its programming as communicated via instruction generation program 500, thereby sending that information along to the country (and ultimately the termination destination) of choice via the carrier (or alternate carrier) specified previously. Transmissions are usually identified as to the originating customer by reference to a trunk group ID or a similar scheme that is associated with the call or other data transmission.

In yet another example scenario, each customer might potentially have its own unique routing structure. Said another way, it is traditional in this industry that the carriers that have been chosen for a country will be utilized by every customer that sends data to that country: the "first choice" (or selected alternative) carrier terminates all calls that are intended for that country. This is the case whether the chosen carrier is acceptable to the customer or not.

By way of general background, in most cases, an intermediary of the sort discussed will utilize switches that provide for partitioning. As a specific example, it is known in the art to partition a switch into two different operational areas—one of which handles the high quality data transmissions and another that handles the lower quality transmissions. The disadvantage of such an arrangement is that every customer will necessarily utilize the same routing. Said another way, when a two-partition (high/low quality) approach is utilized, the understanding is that each customer in the "high quality" partition will utilize exactly the same routing. This can create a variety of problems. For example, if one customer in the high quality partition is having problems terminating a call to a particular fax machine in India, it might be desirable to try an alternative routing to fix the problem. However, if a change in the routing is made to accommodate the customer having problems, every other customer in the same partition will be similarly affected.

However, a separate partition may be created within the switching device that corresponds to a single customer. Thus, in some circumstances there might be high/low quality partitions and, additionally, one or more partitions that have been assigned to individual customers. This individual-client partition is assigned a routing structure according to the methods discussed previously. Then, customer data that is found (e.g., by reference to a trunk group ID) to be associated with this particular partition—which might be configured for as few as a single customer—is routed in the manner programmed previously, independently of how other customers might be routed to that destination.

When customer-specific information is used to route a call in an Internet protocol ("IP," hereinafter)-based network environment, a separate partition that corresponds to a particular customer may be created within the packet-based switching device (e.g., Sonus GSX, PSX, and/or NBS). This can be achieved by preserving customer-specific information within the signaling information associated with the call. In accordance with an embodiment, such customer-specific information can be included in a FROM header associated with an invite message. The FROM header associated with an invite message can include such attributes as an identification parameter assigned to the ingress trunk group, the IP address assigned to the ingress gateway, and/or the identification parameter assigned to the ingress gateway port. The FROM header may also include one or more phone numbers associated with the party initiating the call. The FROM header associated with the call can be embedded within an invite message in session initiation protocol ("SIP," hereinafter) format.

Figure 6:
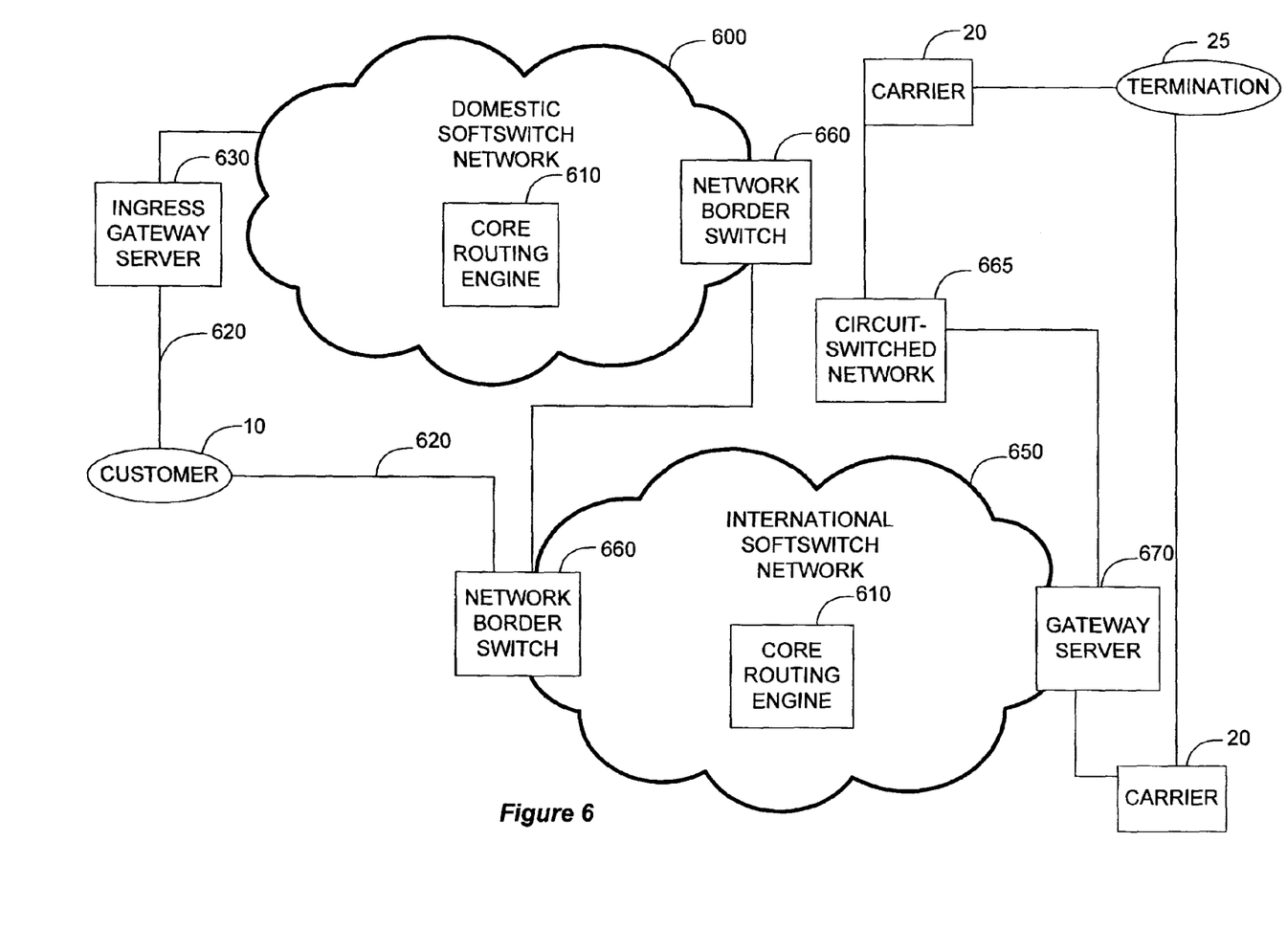
FIG. 6 depicts a network-level schematic of an environment of the instant invention in greater detail.

The invite message can be transferred between two IP-based networks via at least two network border switches 660, which are shown in FIG. 6. For example, one network border switch 660 can be located within a domestic softswitch network 600 and another network border switch 660 can be located within an international softswitch network 650. The IP-based networks, including the network border switches, can be configured such that the trunk groups connecting the network border switches 660 maintain attributes within the invite message, such as the identification parameter assigned to the ingress trunk group 620 and the IP address and port of the ingress gateway server 630. It should be noted that the ingress trunk group 620 can connect the customer to a softswitch network through an ingress gateway server 630, a network border switch 660, or any number of other network devices. In an embodiment, the IP based networks can be configured so that the hop-by-hop routing feature is disabled. In this configuration, routing is based on the content of the invite message and not the IP trunk group. Moreover, and according to another exemplary embodiment, the customer-specific information within the invite message used to route a call over an IP network, as described above, can also be used to route the call from the IP network to a circuit-switched network.

An example of the invite message exhibiting the attributes discussed above is:

---
<sip:[calling party's telephone number]@[ingress gateway IP address]:[ingress gateway port identification];[origin trunk group identification]>;tag=1
---

Moreover, and according to another exemplary embodiment as illustrated generally in FIG. 6, at least a portion of the routing path from a customer 10 to a carrier 20 can include an Internet protocol network in which session initiation protocol ("SIP," hereinafter) for call setup and signaling. By way of general background, an intermediary 15 can use an IP network 600 to terminate a call on behalf of a customer 10. IP networks, otherwise known as softswitch networks, use devices known as core routing engines 610 to route calls, which eventually stop at the call termination point 20. An example IP network 600 is a domestic network called the North American softswitch network. For domestic calls, the domestic softswitch network 600 can both accept and terminate customers' calls. For international calls originating in domestically, the call can be transferred from the domestic softswitch network 600 to an international softswitch network 650 via a network border switch 660. The call can then be terminated directly by transferring the call from the international softswitch network 650 to a carrier 20 for delivery to the termination point 25. Alternatively, the call can be terminated by transferring the call from the international softswitch network 650 to a circuit-switched network 665 via a gateway server 670.

Figure 7:
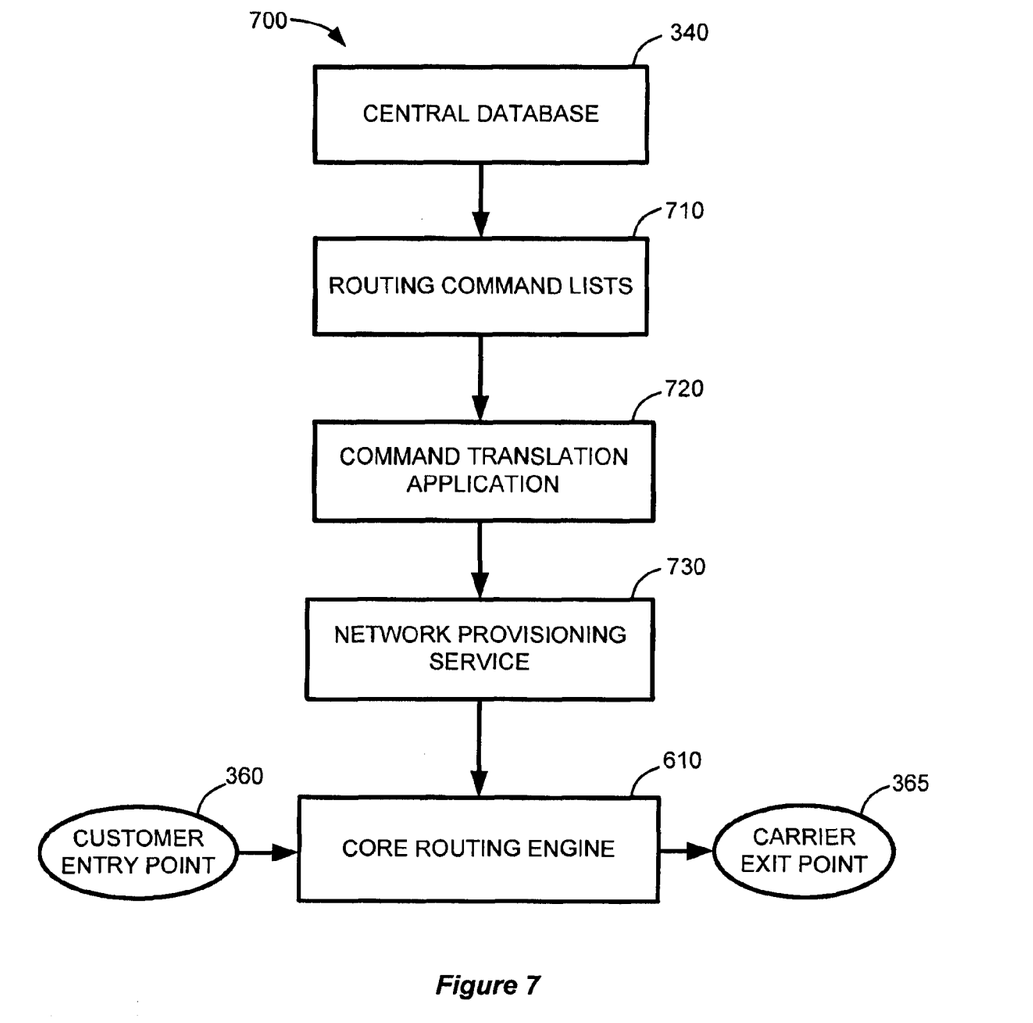
FIG. 7 depicts the system of FIG. 3 in greater detail in accordance with embodiment of the present invention represented in FIG. 6.

To accommodate for the architecture described above with respect to FIG. 6, FIG. 7 illustrates additional components or embodiments 700 that can be added to the system of FIG. 3 in accordance with the present invention. In this embodiment, the system of FIG. 7 includes a core routing engine 610, routing command lists 710, a command translation application 720, and a network provisioning service 730. Both the central computerized database 340 and the command translation application 720 may have read and write access to the routing command lists 710; thereby, providing both applications the ability to update the routing command lists 710. The command translation application 720 can utilize the routing command lists 710 to translate routing requests into switching instructions to be used by a network provisioning service 730. The network provisioning service 730 may then provide switching instructions to the IP-based core routing engine 610.

Figure 8:
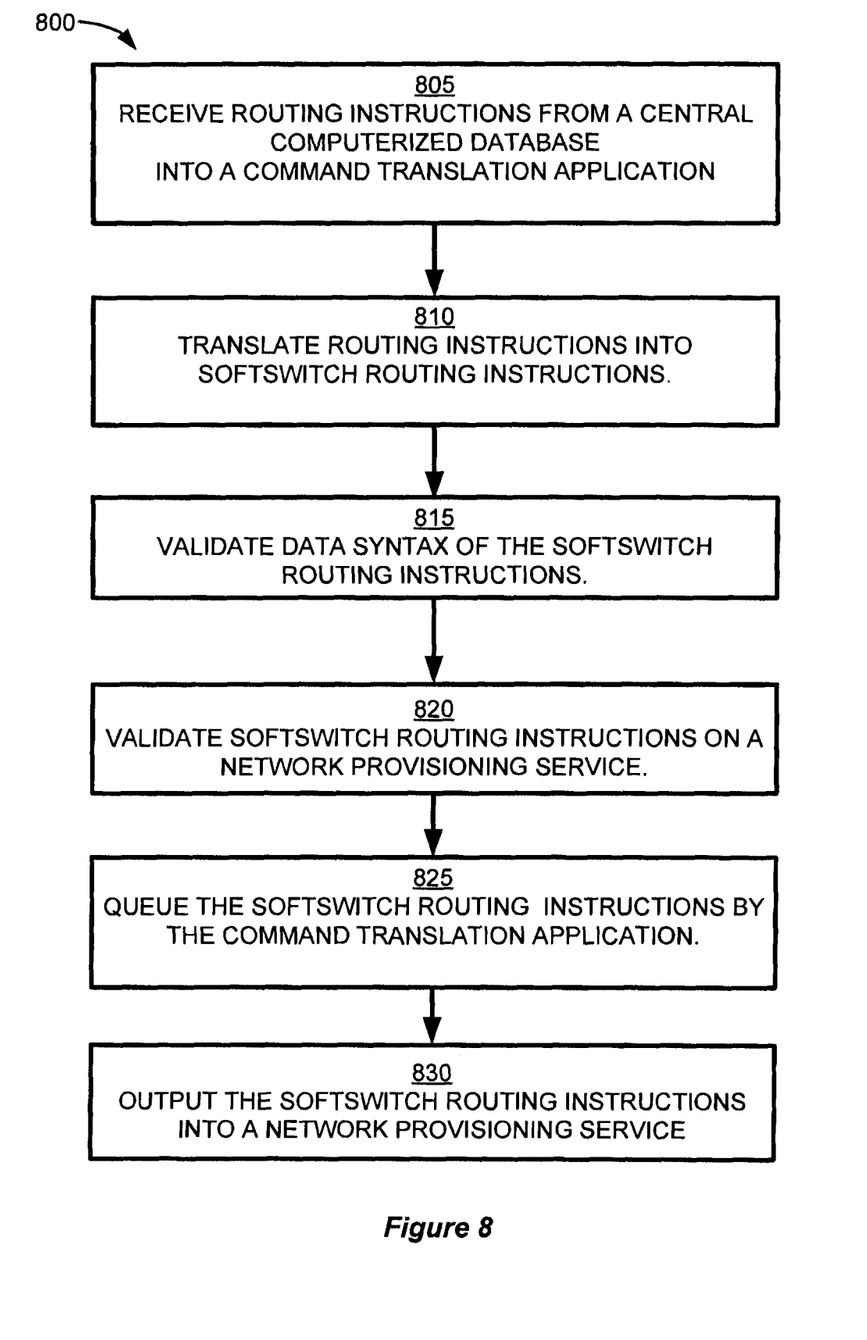
FIG. 8 is a process depicting operation of a command translation application shown in FIG. 7 in accordance with an embodiment present invention.

Turning now to FIG. 8, the command translation application 720 is shown in more detail in accordance with an embodiment of the present application. In particular, operation of the command translation operation 720 is shown on a flowchart 800 that is initiated at step 805 and terminates at step 830. In step 805, the method receives routing instructions from the central computerized database into a command translation application. In step 810, the method translates the routing instructions into one or more routing instructions including at least a softswitch network. The path of the translated routing instructions need not travel exclusively over a softswitch network. Indeed, one of the exemplary embodiments includes both a softswitch network as well as a circuit-switched network. In step 815, the method validates the translated routing instructions by the command translation application, whereby the command translation application validates data syntax within the SIP invite message. The command translation application may also validate other portions of the routing instructions as well. In step 820, the method validates the softswitch routing instructions on a network provisioning service. In step 825, the method queues the translated routing instructions by the command translation application. In step 830, the method outputs the translated routing instructions into a network provisioning service.

For purposes of the instant disclosure, the term "voice" as it applies to the transmission of information between a customer and a carrier should be broadly construed to include traditional telephonic voice signals, as well as fax signals, video signals, and other data signals.

Further, it should be noted that although the exemplary embodiments disclosed throughout this specification have been largely described in terms of a one-way transmission from a customer to a carrier, in fact the transmission could very well be two-way, e.g., in the case of a telephone call voice data will flow in both directions, typically along the same signal path. As a consequence, when the terms "customer entry point" and "carrier exit point" are used herein, those terms should be understood to include situations where the flow of information includes transmissions from the carrier back to the customer, i.e., the "entry" and "exit" points are actually "access" points.

It should also be understood and remembered that when reference is made herein to transmitting a signal from a customer to a carrier, that concept should be broadly interpreted to include instances where the signal received from the customer is modified by the intermediary during its transmission. As a specific example, in some cases it might prove to be beneficial to apply data compression, encryption, etc. to the signal received from the customer. In this case, the compressed signal—as opposed to the actual signal received from the customer—will typically be transmitted along the route chosen by the intermediary and then expanded before handing it off to the carrier. The advantages of such a scheme are well known to those of ordinary skill in the telecommunications arts. As an example only, unless lossless compression is utilized, the reconstructed signal that is provided to the carrier might be slightly different from the signal that was originally provided by the customer. Thus, in those instances herein where a signal is said to be transmitted from a customer to a carrier it should be understood that the signal might very well undergo one or more transformations during the time that it is under the control of the intermediary and, further, upon exit from the instant system it might differ in some insignificant ways from the signal originally received. Still, the signal provided to the carrier will be, for all practical purposes, the same as the signal that was originally received. As such, when a signal is said to be transmitted from a customer to a carrier herein, it should be understood that so long as the signal that is received by the carrier is substantially the same as the customer's signal, the received signal will be said to be the same signal.

Although the present invention has been described with reference to various exemplary embodiments, it will be understood that the invention is not limited to the details thereof. Various modifications and substitutions will occur to those of ordinary skill in the art. All such substitutions are intended to be embraced within the scope of the invention.

What is claimed is:

1. A method of provisioning routing instructions between a customer entry point and a termination destination, comprising the steps of:
   receiving one or more routing instructions from a central computerized database;
   incorporating customer-specific information into the one or more routing instructions, wherein the customer-specific information is contained in a session initiation protocol (SIP) invite message, the customer specific information including at least one attribute associated with one or more of an ingress trunk group, an ingress gateway or an ingress gateway port;
   translating the one or more routing instructions into routing instructions operable on a softswitch network;
   outputting the translated routing instructions into a network provisioning service; and
   issuing a command to disable hop-by-hop routing in the softswitch network.

2. The method as recited in claim 1, wherein the step of determining a routing path between a customer entry point and a termination destination is based on the criteria of price.

3. The method as recited in claim 1, wherein the step of determining a routing path between a customer entry point and a termination destination is based on the criteria of quality.

4. The method as recited in claim 1, wherein the step of determining a routing path between a customer entry point and a termination destination is based on the criteria of customer preference.

5. The method as recited in claim 1, further comprising the step of:
   validating the translated routing instructions.

6. The method of claim 1 wherein the SIP message is of the form:
   <sip:[Calling party's telephone number]@[ingress gateway IP address]:[ingress gateway port identification]; [origin trunk group identification]>; tag=1.

7. A method of configuring a signal path between a customer entry point and a carrier exit point, comprising the steps of:
   a. receiving a request to connect a call with a termination destination;
   b. accessing the termination destination based on criteria of customer preference contained in a session initiation protocol (SIP) invite message including at least one attribute associated with one or more of an ingress trunk group, an ingress gateway or an ingress gateway port;
   c. selecting a carrier capable of accessing the termination destination, in accordance with the criteria of customer preference;
   d. determining a route for the signal path between the customer entry point and a carrier exit point accessible by the selected carrier, wherein the signal path passes through at least one switching device;
   e. translating the routing for the signal path to include at least a plurality of packet-switched routing instructions for use in a packet-switched network;
   f. validating the plurality of packet-switched routing instructions;
   g. queuing the plurality of packet-switched routing instructions; and
   h. outputting said plurality of packet-switched routing instructions into a network provisioning service; and
   i. issuing a command to disable hop-by-hop routing in the packet-switched network.

8. The method as recited in claim 7, further comprising the step of:
   incorporating customer-specific information into the plurality of packet-switched routing instructions.

9. The method as recited in claim 7, wherein step (e) further comprises the step of:
   storing a route command list capable of translating the routing for the signal path into a plurality of packet-switched routing instructions.

10. The method as recited in claim 7 wherein the step of selecting a carrier from a plurality of carriers capable of accessing the termination destination based on criteria of price.

11. The method as recited in claim 7 wherein the step of selecting a carrier from a plurality of carriers capable of accessing the termination destination based on criteria of quality.

12. The method as recited in claim 7, wherein the SIP invite message comprises:
    a calling party identification parameter;
    an ingress trunk group identification parameter;
    an ingress gateway server internet protocol (IP) address; and
    an ingress gateway port identification.

13. The method of claim 7 wherein the SIP message is of the form:
    <sip:[Calling party's telephone number]@[ingress gateway IP address]:[ingress gateway port identification]; [origin trunk group identification]>;tag=1.

14. A method of provisioning routing instructions between a customer entry point and a termination destination, comprising:
    initiating a transmission between a customer entry point and a first softswitch border switch;
    initiating a transmission between the first softswitch border switch and a second softswitch border switch;
    issuing a command to disable hop-by-hop routing in the first softswitch border switch and the second softswitch border switch;
    initiating a transmission between the second softswitch border switch and a softswitch core routing engine;
    initiating a transmission between the softswitch core routing engine and the second network border switch;
    initiating a transmission between the second network border switch and a gateway server; and
    initiating a transmission between the gateway server and a termination destination, wherein the termination destination is selected based at least in part on customer-specific information contained within a session initiation protocol (SIP) invite message, the customer specific information including at least one attribute associated with one or more of an ingress trunk group, an ingress gateway or an ingress gateway port.

15. The method as recited in claim 14, wherein the termination destination is a carrier.

16. The method as recited in claim 14, wherein the termination destination is a circuit switched routing engine.

17. The method of claim 14 wherein the SIP message is of the form:
    <sip:[Calling party's telephone number]@[ingress gateway IP address]:[ingress gateway port identification]; [origin trunk group identification]>;tag=1.

18. A method of configuring a signal path between a customer entry point and a carrier exit point, comprising the steps of:
    a. receiving a request to connect a call with a termination destination;

b. accessing the termination destination based on criteria of customer preference contained in a session initiation protocol (SIP) invite message including a calling party identification parameter, an ingress trunk group identification parameter, an ingress gateway server internet protocol (IP) address, and an ingress gateway port identification;
c. selecting a carrier capable of accessing the termination destination, in accordance with the criteria of customer preference;
d. determining a route for the signal path between the customer entry point and a carrier exit point accessible by the selected carrier, wherein the signal path passes through at least one switching device;
e. translating the routing for the signal path to include at least a plurality of packet-switched routing instructions;
f. validating the plurality of packet-switched routing instructions;
g. queuing the plurality of packet-switched routing instructions; and
h. outputting said plurality of packet-switched routing instructions into a network provisioning service.

19. The method as recited in claim 18, further comprising the step of:
incorporating customer-specific information into the plurality of packet-switched routing instructions.

20. The method as recited in claim 18, wherein step (e) further comprises the step of:
storing a route command list capable of translating the routing for the signal path into a plurality of packet-switched routing instructions.

21. The method as recited in claim 18 wherein the step of selecting a carrier from a plurality of carriers capable of accessing the termination destination based on criteria of price.

22. The method as recited in claim 18 wherein the step of selecting a carrier from a plurality of carriers capable of accessing the termination destination based on criteria of quality.

* * * * *